US005777544A

United States Patent [19]
Vander Mey et al.

[11] Patent Number: 5,777,544
[45] Date of Patent: Jul. 7, 1998

[54] APPARATUS AND METHOD FOR CONTROLLING DATA COMMUNICATIONS HAVING COMBINATION OF WIDE AND NARROW BAND FREQUENCY PROTOCOLS

[75] Inventors: James E. Vander Mey; Bruce A. Denton, both of Ocala, Fla.

[73] Assignee: Intellon Corporation, Ocala, Fla.

[21] Appl. No.: 818,457

[22] Filed: Mar. 17, 1997

[51] Int. Cl.$^6$ ................................................ H04M 11/04
[52] U.S. Cl. .................. 340/310.06; 340/310.01; 340/310.04; 340/310.08; 370/344; 370/480; 375/222; 375/354
[58] Field of Search ................. 340/310.01, 310.02, 340/310.03, 310.04, 310.05, 310.06, 310.07, 310.08, 928, 825.49, 572; 375/260, 222, 354; 370/343, 344, 204, 480, 481

[56] References Cited

U.S. PATENT DOCUMENTS

| | | |
|---|---|---|
| 2,705,795 | 4/1955 | Fisk et al. |
| 2,899,548 | 8/1959 | Boughtwood et al. |
| 3,354,433 | 11/1967 | Minc |
| 3,601,545 | 8/1971 | Saburi |
| 4,189,713 | 2/1980 | Duffy |
| 4,200,862 | 4/1980 | Campbell et al. |
| 4,307,380 | 12/1981 | Gander ............................. 340/310.01 |
| 4,328,581 | 5/1982 | Harmon et al. ........................... 371/8 |
| 4,377,754 | 3/1983 | Thompson |
| 4,527,561 | 7/1985 | Burke |
| 4,577,332 | 3/1986 | Brenig |
| 4,616,364 | 10/1986 | Lee |
| 4,628,440 | 12/1986 | Thompson |
| 4,638,299 | 1/1987 | Campbell |
| 4,665,519 | 5/1987 | Kirchner et al. |

(List continued on next page.)

OTHER PUBLICATIONS

Article "Welcome to Echelon" pp. 1.
"Intellon Connecting the Future", Technical Article #0593 pp. 1–17.
A CEBus Standard Background, pp. 1–6 and 6 pp. of drawings.
Communication Systems Design, "The CEBus Communication Standard, Part 1 and Part 2", pp. 1–12, dated Feb. 1996.
"Intellon", pp. 1–22, dated Jun. 1996.
"X–10 USA:Home Page", pp. 1–22, dated Oct., 1996.
EIA Home Automation Systems "Electronic Industries Association", pp. 1–5, dated Oct., 19.
Communications "Spread–spectrum data leap through ac power wiring", pp. 48–53, dated Nov., 1996.

*Primary Examiner*—Nina Tong
*Attorney, Agent, or Firm*—Allen Dyer Doppelt; Milbrath & Gilchrist

[57] ABSTRACT

An apparatus and methods are provided for controlling data communications across power lines. The apparatus preferably has a power line interface for interfacing with a power line so as to detect both a wide bandwidth data communications protocol being initiated across the power line and a narrow bandwidth data communications protocol being initiated across the power line synchronously with the power line mains frequency and so as to initiate either a wide bandwidth data communications protocol onto the power line or a narrow bandwidth data communications protocol onto the power line synchronously with the power line mains frequency. The narrow bandwidth of the narrow bandwidth data communications protocol preferably falls within the wide bandwidth of the wide bandwidth data communications protocol. An input wide and narrow bandwidth protocol receiver is positioned responsive to the power line interface for receiving either the wide bandwidth protocol or the narrow bandwidth protocol. An output wide and narrow bandwidth protocol transmitter is connected to the power line interface for transmitting a selected one of either the wide bandwidth protocol or the narrow bandwidth protocol. A protocol controller is positioned responsive to the input protocol receiver and the output protocol transmitter for controlling the receipt of and the transmission of wide bandwidth and narrow bandwidth data communications protocols.

58 Claims, 3 Drawing Sheets

U.S. PATENT DOCUMENTS

| | | | |
|---|---|---|---|
| 4,809,296 | 2/1989 | Braun et al. | |
| 5,005,187 | 4/1991 | Thompson. | |
| 5,046,066 | 9/1991 | Messenger. | |
| 5,090,024 | 2/1992 | Vander Mey et al. | |
| 5,113,394 | 5/1992 | Kotzin. | |
| 5,247,519 | 9/1993 | Snowden et al. | |
| 5,263,046 | 11/1993 | Vander Mey. | |
| 5,268,666 | 12/1993 | Michel et al. | |
| 5,276,680 | 1/1994 | Messenger. | |
| 5,278,862 | 1/1994 | Vander Mey. | |
| 5,289,183 | 2/1994 | Hassett et al. | 340/905 |
| 5,289,499 | 2/1994 | Weerackody. | |
| 5,297,143 | 3/1994 | Fridrich et al. | |
| 5,339,000 | 8/1994 | Bashan et al. | 340/932.2 |
| 5,339,334 | 8/1994 | Baghdady. | |
| 5,359,625 | 10/1994 | Vander Mey et al. | |
| 5,414,694 | 5/1995 | Crayford et al. | |
| 5,448,229 | 9/1995 | Lee, Jr. | |
| 5,452,291 | 9/1995 | Eisenhandler et al. | |
| 5,471,190 | 11/1995 | Zimmermann. | |
| 5,475,687 | 12/1995 | Markkula, Jr. et al. | |
| 5,477,216 | 12/1995 | Lee, Jr. et al. | |
| 5,485,630 | 1/1996 | Lee, et al. | |
| 5,488,723 | 1/1996 | Baradel et al. | |
| 5,490,276 | 2/1996 | Doli, Jr. et al. | |
| 5,495,239 | 2/1996 | Ouellette. | |
| 5,500,794 | 3/1996 | Fujita et al. | |
| 5,500,852 | 3/1996 | Riley. | |
| 5,519,878 | 5/1996 | Dolin, Jr. | |
| 5,539,745 | 7/1996 | Chang et al. | |
| 5,570,085 | 10/1996 | Bertsch. | |
| 5,574,748 | 11/1996 | Vander Mey et al. | |
| 5,579,482 | 11/1996 | Einkauf et al. | |
| 5,596,574 | 1/1997 | Perlman et al. | |
| 5,686,902 | 11/1997 | Reis et al. | 340/457 |

APPARATUS AND METHOD FOR CONTROLLING DATA COMMUNICATIONS HAVING COMBINATION OF WIDE AND NARROW BAND FREQUENCY PROTOCOLS

FIELD OF THE INVENTION

The present invention relates to the data communications industry and, more particularly, to the field of data communications for communicating data across power lines.

BACKGROUND OF THE INVENTION

Over the years, data communications has developed for the computer industry into what is now extensive sophistication in hardware and software systems for facilitating various types of data communications. Nevertheless, extensive sophistication and advancements in many hardware and software systems can be thwarted from market or commercial applicability for many reasons. For example, if a new data communications system is not compatible with an existing system, many users will not purchase the new system. Attempts for a single manufacturer to become the system to which all others must be compatible can be quite difficult to achieve and, even if successful, can cost this manufacturer a great deal of investment. Attempts for different manufacturers to interface with each other often creates complex and expensive systems which can confuse system purchasers and installers alike and can often make the problems worse. Also, manufacturers of systems are reluctant to develop or introduce new systems to the market when compatibility and user confusion are such big issues. Accordingly, compatibility with other existing or even future systems has been emphasized in various industries so that industry standards to accomplish compatibility goals of the data communication systems have resulted.

One example of an industry standard for building or home automation data communication systems has been the X10 or X-10™ data communications protocol for remote control of electrical devices which communicate across standard wiring or power lines of a building such as a home. In general, methods of ensuring the accuracy of transmitted and received data are known as data communications protocols. The X10 data communications protocol allows various home electronic devices, such as lighting controllers or switches, status indicators, security systems, telephone interfaces, computer interfaces, and various home appliances, to readily be linked together for simple control applications. The X10 data communications protocol generally has a narrow bandwidth, i.e., 120 KiloHertz ("KHz"), for communicating data at a relatively slow speed, i.e., 60 bits/second.

Another example of an industry standard for building or home automation data communication systems has been the Consumer Electronic Bus ("CEBus") data communications protocol which is a local communications and control network designed specifically for the home. Like X10, the CEBus network provides a standardized communication facility for exchange of control information and data among various devices and services in the home, such as lighting controllers or switches, status indicators, security systems, telephone interfaces, computer interfaces, stereo systems, and home appliances. The CEBus data communications protocol was developed by the Consumer Electronics Group of the Electronic Industries Association ("EIA") and an inter-industry committee of representatives from both EIA and non-member companies. The CEBus data communications protocol generally has a wide bandwidth, i.e., 100-400 KHz, for communicating data at a relatively fast speed, i.e., 10 Kilobits/second and is significantly faster and more reliable than the X10 data communications protocol. The CEBus data communications protocol also allows full networking of user application devices.

Despite the advancements of compatibility which result when particular industries adopt standards, another problem arises when an industry desires to change or make a transition to new standards. These new standards, for example can often provide higher speed capabilities or other significant improvements over previous standards. The new standards, however, often are not adopted because the new standard is not compatible with the existing standard. In other words, the market will not accept or is reluctant to accept, the new standard because it may require replacement of all existing systems with which the user wants to communicate. This can cause technology stagnation and inhibit rapid advancement of technology, e.g., hardware and software, in various industries such as the home automation industry.

SUMMARY OF THE INVENTION

With the foregoing in mind, the present invention advantageously provides an apparatus and method for data communications that enables users of existing data communication systems to make an easy transition into a new data communications protocol. An apparatus and method of the present invention also advantageously provide home automation data communication that quickly and accurately transmits and receives data communication for various home automation functions. The apparatus and method of the present invention advantageously improve networking functions for home automation and can be used in conjunction with other home automation controllers. The present invention advantageously further provides an apparatus and method that allows users and installers to readily retrofit or add new systems to an existing data communications network. The present invention further advantageously provides a network data communications apparatus and method which receive both a wide bandwidth data communications protocol and a narrow bandwidth data communications protocol wherein the narrow bandwidth of the narrow bandwidth data communications protocol falls within the wide bandwidth of the wide bandwidth data communications protocol.

More particularly, a data communications controlling apparatus according to the present invention is provided for controlling data communications across a power line. The apparatus preferably has power line interfacing means for interfacing with a power line so as to detect both a wide bandwidth data communications protocol being initiated across the power line and a narrow bandwidth data communications protocol being initiating across the power line so as to initiate either a wide bandwidth data communications protocol onto the power line or a narrow bandwidth data communications protocol onto the power line. The narrow bandwidth of the narrow bandwidth data communications protocol preferably falls within the wide bandwidth of the wide bandwidth data communications protocol. The narrow bandwidth data communications protocol, for example, is also preferably detected and initiated synchronously with the power line mains frequency. The wide bandwidth frequency data communications protocol is preferably provided by a spread spectrum CEBus data communications protocol, and the narrow bandwidth frequency data communications protocol is preferably provided by an X10 data communications protocol. Wide and narrow bandwidth protocol transmitting and receiving means is responsive to the power line interfacing means for selectively transmitting either the wide bandwidth protocol or the narrow bandwidth protocol onto the power line and for receiving both the wide bandwidth protocol and the narrow bandwidth protocol. Protocol controlling means is responsive to the protocol transmitting and receiving means for controlling the receipt of and the transmission of wide bandwidth and narrow bandwidth data communications protocols.

The protocol transmitting and receiving means of a data communications controlling apparatus preferably includes a transmitter for transmitting data communications and a waveform memory device responsive to the transmitter for storing a digital representation of a selected waveform to be used for either the wide bandwidth protocol or the narrow bandwidth protocol for transmission. This feature of the invention, for example, allows the apparatus to be networked or used either for selectively transmitting the X10 data communications protocol, e.g., about 120 KHz, or the CEBus data communications protocol, e.g., about 100–400 KHz, or, in the alternative, for transmitting only the X10 data communications protocol or the CEBus data communications protocol, or both.

Methods of controlling data communications across a power line are also provided according to the present invention. A method of controlling data communications across a power line preferably includes interfacing with a power line so as to detect both a wide bandwidth data communications protocol being initiated across a power line and a narrow bandwidth data communications protocol being initiating across the power line and so as to initiate either a wide bandwidth data communications protocol or a narrow bandwidth data communications protocol onto the power line. The narrow bandwidth of the narrow bandwidth data communications protocol preferably falls within the wide bandwidth of the wide bandwidth data communications protocol. Both the wide bandwidth data communications protocol and the narrow bandwidth data communications protocol are received, and at any instant of time either the wide bandwidth data communications protocol or the narrow bandwidth data communications protocol is selectively transmitted onto the power line. The receipt of and the transmission of wide bandwidth and narrow bandwidth data communications protocols are also controlled.

The present invention therefore advantageously provides, for example, an apparatus and methods which enables existing user application networks that use an X10 data communications protocol to readily obtain the benefits of using the faster spread spectrum CEBus data communications protocol. The apparatus and method can advantageously use the same data communications signal path and thereby provide a simplified and relatively inexpensive data communications control operation. The apparatus and methods also allow a user to readily add applications requiring the faster spread spectrum CEBus data communications protocol.

Additionally, the apparatus and methods of the invention advantageously provide network and system users with additional flexibility in planning and developing network applications so that barriers to market development in various industries, e.g., not necessarily limited to building or home automation industries, are substantially reduced. The present invention further advantageously provides a less expensive network data communications controlling apparatus and methods that uses many of the same components for receiving and transmitting data communications for both a wide bandwidth data communications protocol and a narrow bandwidth data communications protocol.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION

The present invention will now be described more fully hereinafter with reference to the accompanying drawings which illustrated preferred embodiments of the invention. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and/or double prime notation are used to indicate similar elements in alternative embodiments.

Figure 1:
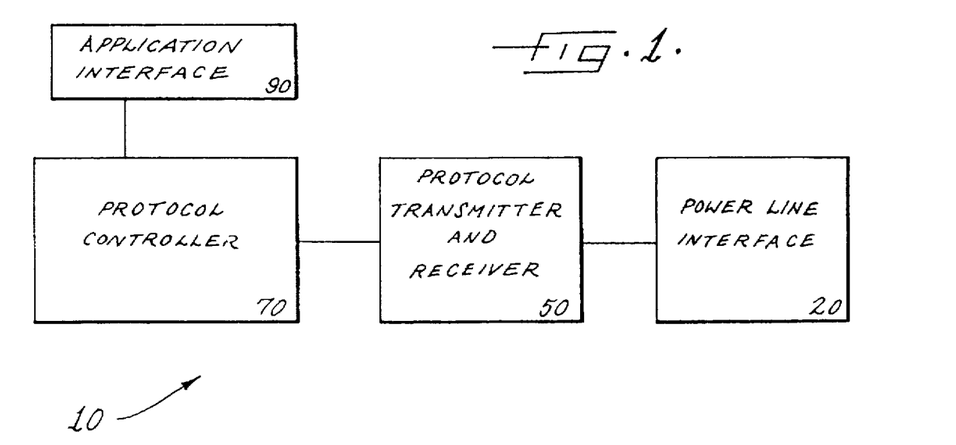
FIG. 1 is a schematic view of a data communications controlling apparatus according to an embodiment of the present invention.

FIG. 1 illustrates an apparatus 10 for controlling data communications across a power line 15 according to an embodiment of the present invention. In an overview, the data communications controlling apparatus 10 preferably has power line interfacing means 20 for interfacing with a power line 15, e.g., an AC power line having up to three phases, so as to detect both a wide bandwidth data communications protocol being initiated across the power line 15 and a narrow bandwidth data communications protocol being initiated across the power line 15 so as to initiate either a wide bandwidth data communications protocol onto the power line or a narrow bandwidth data communications protocol onto the power line 15. The narrow bandwidth of the narrow bandwidth data communications protocol preferably falls within the wide bandwidth of the wide bandwidth data communications protocol. The narrow bandwidth data communications protocol, for example, also is preferably synchronously detected and initiated with the power line mains frequency. This synchronous detection and initiation advantageously is particularly applicable to an X10 data communications protocol as understood by those skilled in the art. Other narrow bandwidth data communication protocols, however, as understood by those skilled in the art will be applicable to the present invention as well.

Figure 2:
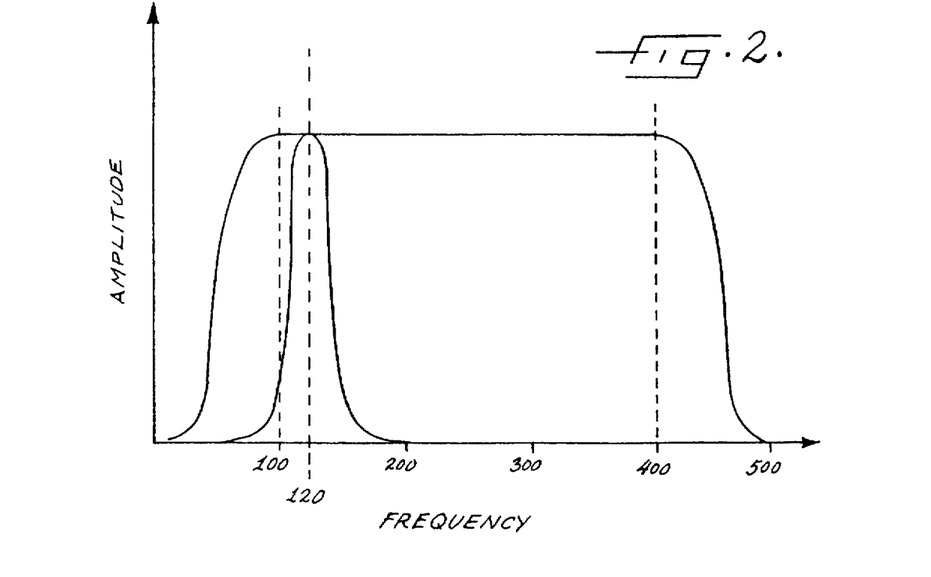
FIG. 2 is a graphical spectral view of a wide bandwidth data communications protocol and a narrow bandwidth data communications protocol each being transmitted across a power line according to the present invention.

Wide and narrow bandwidth protocol transmitting and receiving means 50, e.g., preferably provided by a transceiver, is positioned responsive to the power line interfacing means for selectively transmitting either the wide bandwidth data communications protocol or the narrow bandwidth data communications protocol onto the power line 15 and for receiving both the wide bandwidth data communications protocol and the narrow bandwidth data communications protocol (see, e.g., FIG. 2). Protocol controlling means 70, e.g., preferably provided by a protocol controller, is positioned responsive to the protocol transmitting and receiving means 50 for controlling the receipt of and the transmission of wide bandwidth and narrow bandwidth data communications protocols.

As understood by those skilled in the art, the wide bandwidth frequency data communications protocol preferably is a spread spectrum CEBus data communications protocol, i.e., EIA/IS-60 for CEBus, and the narrow bandwidth frequency data communications protocol preferably is an X10 data communications protocol. The Electronics Industries Association Standards for these respective protocols are hereby incorporated herein by reference. The CEBus and X10 data communication protocols are industry standards for building or home automation and beneficially are particularly advantageous when used with the present invention for these industries where a data communications controlling apparatus 10 that provides transitioning means, e.g., preferably provided by a network controller module 80 as described further herein below, between these two data communications protocol is desired and needed.

Figure 3:
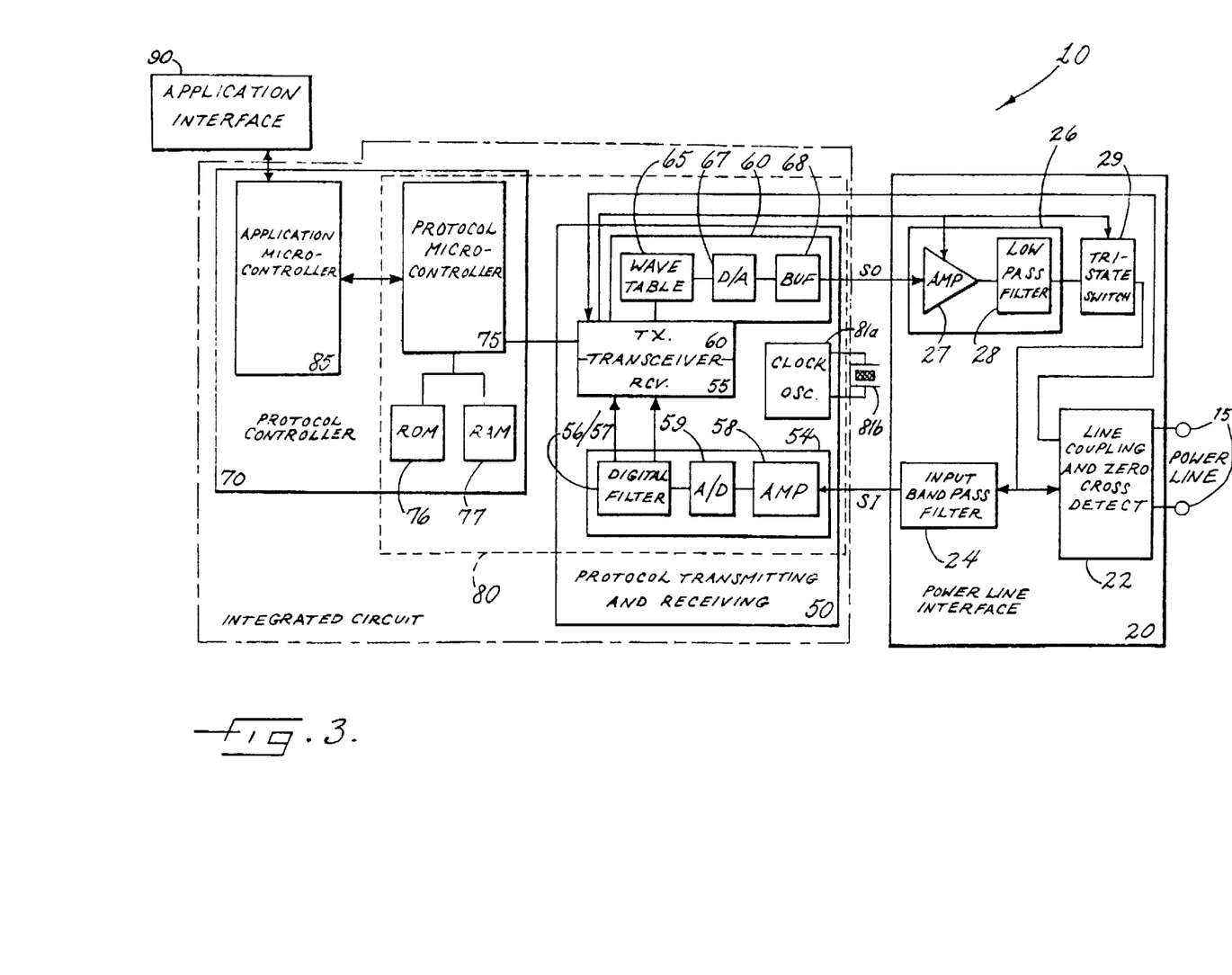
FIG. 3 is a schematic view of a data communications controlling apparatus according to an embodiment of the present invention.

FIG. 3 illustrates a power line node application using a data communications controlling apparatus 10 according to an embodiment of the present invention. As illustrated, the apparatus 10 preferably includes a network controller module 80, e.g., preferably provided by an integrated combination CEBus and X10 data communication protocol device such as a customized integrated circuit, and a clock oscillator circuit 81a, 81b for generating internal timing signals for operation of the module 80. The data communications controlling apparatus 10 using the network controller module 80 advantageously requires only a minimum of additional external components to provide the power line interfacing means 20. The external components, for example, preferably perform output signal amplification and filtering, input signal filtering, and coupling of the module 80 to the power line 15. It will also be understood by those skilled in the art that these external components can be integrated either as a separate integrated circuit or in the same integrated circuit as the network controller module 80. This embodiment of the apparatus 10, for example, advantageously provides an apparatus 10 for transmitting and receiving both CEBus and X10 data communication protocols with a minimum number of external components having a reduced overall system complexity. The present invention advantageously provides a less expensive network data communications controlling apparatus 10 that uses many of the same components for receiving and transmitting data communications for both a wide bandwidth data communications protocol and a narrow bandwidth data communications protocol. The apparatus 10 thereby advantageously reduces duplicate components which may be required by separate data communication systems.

As best illustrated in FIG. 3, the power line interfacing means 20 preferably is defined by a plurality of external components or blocks and includes a line coupler 21 for coupling to the power line 15. The line coupler 21 preferably couples to a power line 15 by means of a broadband transformer and a low frequency blocking capacitor to thereby attenuate the power line 60 Hz component. A zero crossing detector 22 is connected to the line coupler 21 for detecting the moment substantially at which the mains voltage of the power line 15 passes through zero so as to properly synchronize the narrow bandwidth data communications protocol. Detection of the power line 60 Hz zero crossings is required for proper synchronization of the X10 data communications protocol transmission and reception.

As understood by those skilled in the art, a zero crossing detector 22, for example, can be formed by a circuit having a transistor, two diodes, three resistors, and a capacitor. The power line interfacing means 20 preferably also has an input bandpass filter 24 connected to the zero crossing detector 22 for filtering out-of-band interference signals from both the wide bandwidth and the narrow bandwidth data communications protocols. The output of the input bandpass filter 24 preferably forms a signal input ("SI") to the network controller module 80. The input bandpass filter 24 advantageously reduces the amplitude of out-of-band interference signals before the signals enter the module SI input. This reduces the possibility that large amplitude out-of-band signals will saturate the module input.

On the output side of the power line interfacing means 20, i.e., after the signal output ("SO") of the network controller module 80, the power line interfacing means 20 also includes output filtering means 26 is positioned responsive to the protocol transmitting and receiving means 50 for filtering the output data communications prior to initiating the selected data communications protocol onto the power line 15. The output filtering means 26 preferably includes an amplifier 27, e.g., a power amplifier, which amplifies and buffers the output signal to allow the node to drive a low impedance power line 15 and a low pass filter 28 which passes the wide bandwidth, e.g., the CEBus 100–400 KHz chirp waveform, or the narrow bandwidth, e.g., the X10 120 KHz carrier waveform, but filters harmonics of these signals that would cause interference in the amplitude modulated ("AM") broadcast band (i.e., 540–1705 KHz). The power line interfacing means 20 preferably also includes switching means 29, e.g., a tri-state switch, connected to the low pass filter 28 and the receive side of the power line interfacing means, e.g., to the zero crossing detector and/or the line coupler, for isolating the node receive path from the low impedance of the low pass filter when the node is in the receive mode. The network module 80 preferably controls the tri-state switch 29 through the tri-state switch ("TS") signal as indicated.

The protocol transmitting and receiving means 50 preferably includes input protocol filtering means 54 responsive to the power line interfacing means 20 for filtering the wide bandwidth protocol and the narrow bandwidth protocol wherein the narrow bandwidth of the narrow bandwidth protocol falls within the wide bandwidth of the wide bandwidth protocol, input protocol receiving means 55 responsive to the input protocol filtering means 54 for receiving the filtered data communications protocol, and output protocol transmitting means 60 responsive to the protocol controlling means 70 and connected to the power line interfacing means 20 for transmitting a selected one of either the wide bandwidth protocol or the narrow bandwidth protocol to a power line 15. As understood by those skilled in the art, the input protocol receiving means 55 and the output protocol transmitting means 60 together preferably form a transceiver or transmitting and receiving circuit formed as part of a customized integrated circuit. It will be understood by those skilled in the art, however, that separate transmitters and receivers may be used as well according to the present invention. A data communication controlling apparatus 10 of the present invention thereby advantageously provides building or home automation data communication that quickly and accurately transmits and receives data communication for various home automation functions. The apparatus 10 also improves networking functions for building and home automation and can be used in conjunction with other building or home automation controllers.

The input protocol filtering means 54 preferably has a receive amplifier 58 connected to the output, e.g., the SI of the module 80, of the input bandpass filter 26 for amplifying and buffering the input analog signal in preparation for conversion to a digital format. An analog-to-digital ("A/D") converter 59, e.g., 10 bit, is connected to the receive amplifier and converts the received input signal to digital form for processing. Digital filtering means 57 preferably is connected to the A/D converter 59 and to the receiving means 55. The digital filtering means 57 preferably includes a bandpass filter 56 is connected to the A/D converter 59 for reducing noise components of both the wide bandwidth data communications protocol and the narrow bandwidth data communications protocol. The digital filtering means 57 also preferably includes a separate digital filter for filtering the narrow bandwidth or X10 data communications protocol.

The input protocol receiving means 55, e.g., preferably provided by a receiver, then receives the filtered data communications protocol and preferably has a matched filter correlator used for both CEBus and X10 symbol or other waveform recognition means during the receive mode to correlate the data communication signals to predetermined values or signal thresholds. As illustrated in FIG. 3, the signal path for the received data communications waveform, such as illustrated in the graphical view of FIG. 2, is advantageously the same for both the wide bandwidth data communications protocol, e.g., spread spectrum CEBus, and the narrow bandwidth data communications protocol, e.g., X10 up to the separation of the narrow bandwidth, e.g., X10, data communications protocol and the wide bandwidth, e.g., CEBus, data communications protocol at the digital filtering means 57.

The output protocol transmitting means 60 preferably includes a transmitter 61 for transmitting data communications and a waveform memory device 65 responsive to the transmitter 61 for storing a digital representation of a selected waveform to be used for either the wide bandwidth protocol or the narrow bandwidth protocol for transmission. The transmitter 61 preferably generates timing signals for transmission of CEBus or X10 symbols in the transmit mode. As illustrated, the signal path for the transmitted data communications waveform also advantageously is the same for either the wide bandwidth output data communications protocol or the narrow bandwidth output data communications protocol.

Preferably, the waveform memory device 65, e.g., preferably provided by a read only memory ("ROM") device, is used to store a digital representation of the waveform used for transmission. For example, a CEBus waveform table can include a 300 point table defining the complete spread spectrum chirp waveform. The X10 waveform table can be shorter and define at least one-quarter cycle of the waveform. A shorter X10 table can be used because the X10 waveform is a continuous wave signal and, therefore, is repetitive over an interval of time. If a one-quarter cycle table is used, the waveform will be repeated four times per cycle with an appropriate sign bit supplied by the transceiver logic. This process can be repeated a number of times appropriate for the length of the X10 carrier transmission. If a table containing one full cycle is used, the table will simply be cycled, i.e., under control of the transceiver block, a number of times appropriate for the length of the X10 carrier transmission.

The waveform memory device 65 preferably provides a low distortion waveform that allows a simple external low-pass filter to control high frequency harmonics. The waveform output on the power line 15 should have distortion levels in compliance with Federal Communication Commission ("FCC") regulations. This particular configuration, for example, advantageously eliminates a need for a higher complexity bandpass filter.

The output protocol transmitting means 60 preferably further includes a digital-to-analog ("D/A") converter 67, e.g., 8 bit, responsive to the waveform memory device 65 for converting or transforming the waveform output values from the waveform memory device 65 to a low distortion analog signal. A transmit buffer 68 preferably is connected to the D/A converter 67 for amplifying and buffering the D/A converter output to a level sufficient to drive the external power amplifier 27.

The protocol controlling means 70 preferably includes a protocol transmitting and receiving interface controller 75, e.g., provided by a data link layer ("DLL") protocol controller or microcontroller formed as part of the module 80, and an application controller 85, e.g., provided by a host or main microcontroller, connected to the protocol transmitting and receiving controller 75. The protocol transmitting and receiving controller 75 preferably provides an interface between the application controller 85 and the protocol transmitting and receiving means 50, e.g., provided by a transceiver circuit. The network module 80, for example, also can have a simple serial peripheral interface connection to minimize the number of interconnects required for interface to the application controller 85. This advantageously provides for use of simple, low pin count microcontrollers in cost sensitive applications. It will also be understood by those skilled in the art, as illustrated in FIG. 3, that the protocol transmitting and receiving controller 75, e.g., the protocol controller, and the application controller 85, e.g., a host microcontroller, additionally can advantageously be included on a single integrated circuit and/or even combined into a single microprocessor on a single integrated circuit, e.g., for simple applications. Accordingly, it will also be understood by those skilled in the art that the protocol controlling means, the protocol transmitting and receiving means, and the power line interfacing means can further advantageously be combined as a single integrated circuit according to the present invention.

The protocol transmitting and receiving controller 75 preferably controls resource intensive functions of the CEBus, e.g., data link layer, and X10 data communications protocols such as transmission and reception of data communication signals representative of data packets, byte to unit symbol time ("UST") conversion for transmission of data packets, UST-to-byte conversion for received data packets, transmit channel access based upon data packet priority and EIA-600 rules, cycle redundancy check ("CRC") generation for transmitted data packets, and error checking received data packets. Similar low level functions are also provided for X10 packet transmission and reception as understood by those skilled in the art. The protocol transmitting and receiving controller 75 preferably includes, or has connected thereto, memory devices such as read only memory ("ROM") 76 and/or random access memory ("RAM") 77 devices as illustrated.

The application controller 85, e.g., preferably provided by a host or main controller, preferably interprets commands and data received over the power line for a user application such as a light switch, an AC outlet, an alarm sensor, appliance control, computer network, audio/video controller, or other building automation function. In essence, the application controller 85 receives and initiates digital and/or analog signals to and from user applications, application devices, or application apparatuses and to and from the protocol transmitting and receiving controller 75. The application controller 85 also preferably performs upper layer operations, if any, of the CEBus and X10 protocols which, for example, can include command interpretation and high level error handling operations.

The apparatus preferably also has application interfacing means 90, e.g., preferably provided by an application interface, responsive to the protocol controlling means 70 for interfacing with a predetermined user application. The application interfacing means 90 preferably is either digital or analog and includes the user function provided to or received from the apparatus 10 such as monitoring the state of a simple switch for a remote light switch application, microcontroller support of the timing signals required to control a triac device in a lamp dimmer, or a serial communication link to a personal computer. It will be understood by those skilled in the art that various other applications can be used as well according to the present invention.

Figure 4:
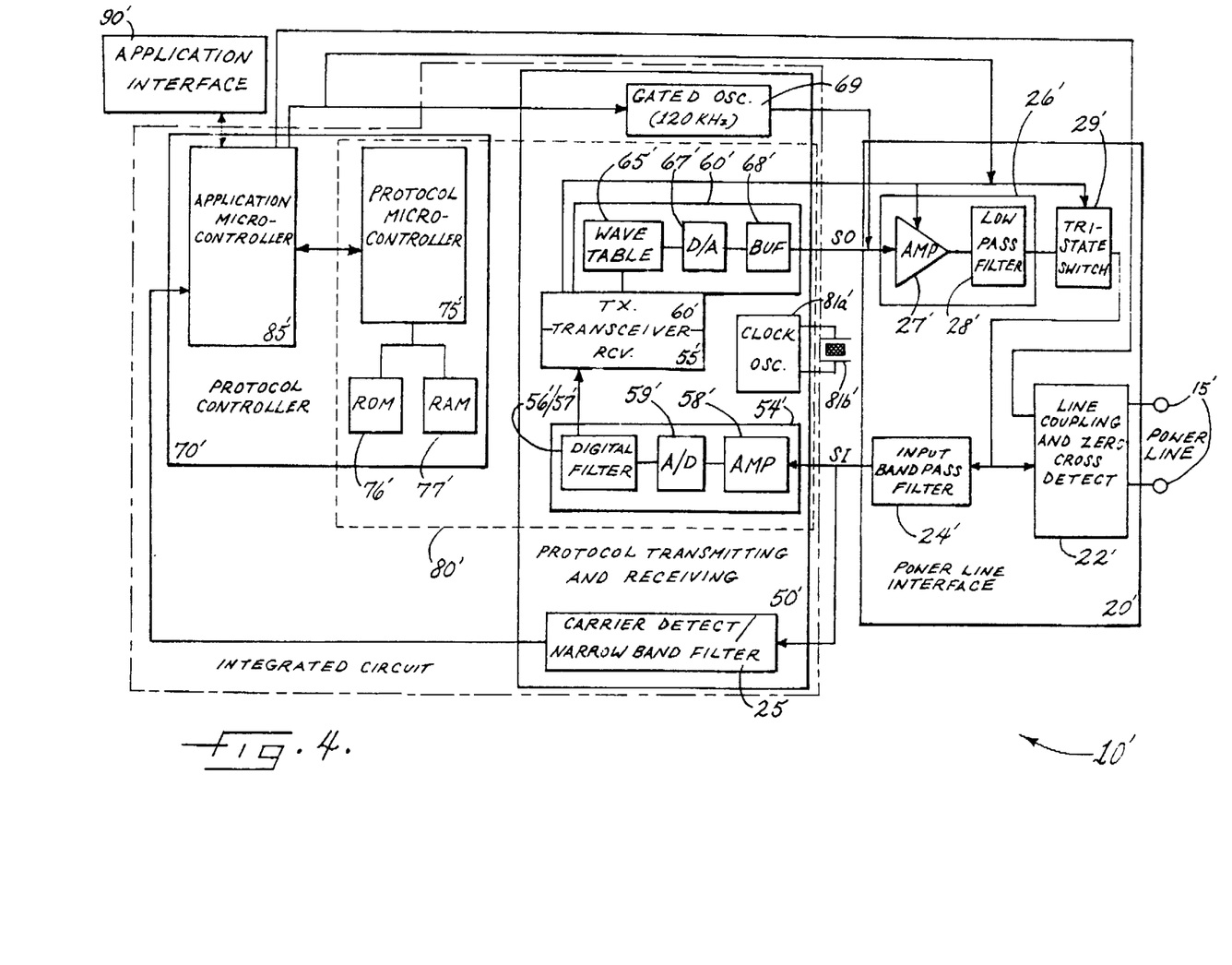
FIG. 4 is a schematic view of a data communications controlling apparatus according to another embodiment of the present invention.

FIG. 4 illustrates an alternative embodiment of a data communications controlling apparatus 10' according to the present invention. This alternative embodiment has a network module 80' which provides only a wide bandwidth data communications protocol, e.g., spread spectrum CEBus data communications protocol, support and uses external components to support a portion of the narrow bandwidth data communications protocol, e.g., X10 data communications protocol. The apparatus 10' advantageously uses a relatively low number of additional external components to add narrow bandwidth data communication protocol, e.g., X10 data communication protocol, to a wide bandwidth data communications, e.g., CEBus data communications protocol, network control module 80'. For brevity and conciseness purposes, the components of the apparatus 10' of this alternative embodiment which are similar to those described above in the other embodiment of the apparatus 10 will not be described in considerably more detail.

As illustrated in FIG. 4, the application controller 85', e.g., provided by a main or host controller, of the protocol controlling means 70' preferably interprets commands and data received over the power line 15', e.g., data communications signals, for the user application and is also responsible for performing the upper layer operations of the CEBus and X10 protocols such as command interpretation and high level error handling. Additionally, however, the application controller 85' provides all low level support for the X10 protocol. This X10 protocol support preferably includes symbol recognition, data packet assembly, and error checking for received messages, symbol synchronization with the power line 60 Hz waveform, and modulation of a transmit gated oscillator for the transmit data packets. The application controller 85' preferably also properly sequences the transmission of CEBus and X10 data communication protocols to avoid simultaneous packet transmission. Output signal amplification and filtering, input signal filtering, and coupling of the network module 80 or network node to the power line 15' preferably are performed using external components as illustrated.

A data communications controlling apparatus 10' of the alternative embodiment of the present invention preferably also has a wide bandwidth and narrow bandwidth protocol transmitting and receiving means 50' which separates the narrow bandwidth protocol support components from the wide bandwidth protocol support components of the network module 80' as illustrated (see FIG. 4). The output protocol transmitting means 60' of the protocol transmitting and receiving means 50' of the apparatus 10' preferably includes a gated oscillator 69 connected to an output of the application controller 85' and the input of the power amplifier 27' for providing a 120 KHz carrier signal for the narrow bandwidth data communication protocol, e.g., the X10 data communication protocol. The gated oscillator 69 preferably is selected to provide a low distortion output waveform to avoid requiring a high complexity low pass filter at the transmit amplifier output. The gated oscillator 69 preferably can be amplitude shift keyed ("ASK") modulated by a data communication signal from the output of the application controller 85'. The input to the gate oscillator 69 is also preferably connected to the input of the tri-state switch 29', as illustrated, to control the tri-state switch 29' during X10 data packet transmission. The output of the gated oscillator 69 preferably is high impedance when the oscillator is gated off to allow the output of the network module 80' to drive the transmit buffer for the wide bandwidth, e.g., CEBus, data communications protocol.

The input protocol receiving means 55' of the data communications controlling apparatus 10' preferably also has a carrier detector or narrow band filter 25 connected to an output of the input bandpass filter and to an input of the application controller 85' as illustrated. The carrier detector or narrow band filter 25, e.g., preferably provided by a phase-lock signal detector, detects the presence of the X10 120 KHz carrier signal (see, e.g., FIG. 2) and provides a logic level output to the application controller 85' to indicate the presence of the carrier. As understood by those skilled in the art, a digital filter or other narrow band filter can be used as well. The application controller 85' preferably matches the carrier detection with the power line zero crossings to decode the narrow bandwidth, e.g., X10, data packet transmission. An output 23 of the zero crossing detector 22' is connected to the application controller 85' for driving the zero crossings input to the application controller 85' instead of the network module 80 as illustrated in the other embodiment of the apparatus 10. The apparatus 10' of this alternative embodiment, for example, advantageously provides for only three signal connections between the X10 support components, i.e., the gated oscillator 69, the carrier detector 25, and the zero crossings detector 22', and the application controller 85'.

As illustrated in FIGS. 1–4, and as described above, methods of controlling data communications across a power line 15 are also provided according to the present invention. A method of controlling data communications across a power line 15 preferably includes interfacing with a power line 15 so as to detect both a wide bandwidth data communications protocol and a narrow bandwidth data communications protocol being initiating across the power line 15 synchronously with the power line mains frequency and so as to initiate either a wide bandwidth data communications protocol or a narrow bandwidth data communications protocol onto the power line 15 synchronously with the power line mains frequency. Both the wide bandwidth data communications protocol and the narrow bandwidth data communications protocol are received from the power line 15, e.g., preferably from the same data communications signal path as illustrated in FIGS. 3–4, and either the wide bandwidth data communications protocol or the narrow bandwidth data communications protocol are selectively transmitted onto the power line 15, e.g., preferably through the same data communications signal path as illustrated in FIGS. 3–4. The receipt of and the transmission of wide bandwidth and narrow bandwidth data communications protocols are also controlled. The wide bandwidth protocol preferably is a spread spectrum CEBus data communications protocol, and the narrow bandwidth protocol preferably is an X10 data communications protocol as understood by those skilled in the art.

The step of interfacing with a power line 15 preferably includes coupling to a power line 15, detecting the moment substantially at which the mains voltage of the power line 15 passes through zero so as to properly synchronize the narrow bandwidth data communications protocol, and filtering out-of-band interference signals from both wide bandwidth and the narrow bandwidth data communications protocols. The step of interfacing with a power line 15 can further include filtering the output data communications prior to initiating the selected data communications protocol onto the power line 15.

The method can also include selectively filtering either the wide bandwidth protocol or the narrow bandwidth protocol. The step of selectively filtering preferably includes reducing noise components of both the wide bandwidth data communications protocol and the narrow bandwidth data communications protocol and separately filtering the narrow bandwidth data communications protocol. As illustrated by the embodiments described above, the narrow bandwidth data communications protocol can be filtered either as a portion of the digital filtering means 57 internal to the network module controller 80 or by an external carrier detector or narrow bandwidth filter. The method can further include storing a digital representation of a selected waveform to be used for transmission of either the wide bandwidth protocol or the narrow bandwidth protocol, interfacing with a predetermined user application, and controlling data communications to and from the predetermined user application.

As described and illustrated, the present invention therefore advantageously provides an apparatus 10, 10' and methods which can be added to and/or retrofitted into existing user application networks that use an X10 data communications protocol and yet enable a user to obtain the benefits of using the faster spread spectrum CEBus data communications protocol. The apparatus 10, 10' and methods also allow a user to readily add applications requiring the faster spread spectrum CEBus data communications protocol. The present invention thereby advantageously provides an apparatus 10, 10' and method for data communications that enables users of existing data communication systems to make an easy transition into a new data communications protocol.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A data communications controlling apparatus for controlling data communications across a power line, the apparatus comprising:

power line interfacing means for interfacing with the power line so as to detect both a wide bandwidth data communications protocol being initiated across the power line and a narrow bandwidth data communications protocol being initiated across the power line synchronously with a power line mains frequency and so as to initiate either the wide bandwidth data communications protocol onto the power line or the narrow bandwidth data communications protocol onto the power line synchronously with the power line mains frequency, a narrow bandwidth of the narrow bandwidth data communications protocol falling within a wide bandwidth of the wide bandwidth data communications protocol;

wide and narrow bandwidth protocol transmitting and receiving means responsive to said power line interfacing means for selectively transmitting either the wide bandwidth protocol or the narrow bandwidth protocol onto the power line and for receiving both the wide bandwidth protocol and the narrow bandwidth protocol; and protocol controlling means responsive to said protocol transmitting and receiving means for controlling the receipt of and the transmission of said wide bandwidth and narrow bandwidth data communications protocols.

2. An apparatus as defined in claim 1, wherein said power line interfacing means includes a life coupler for coupling to the power line and a zero crossing detector connected to said line coupler for detecting a moment substantially at which a mains voltage passes through zero so as to properly synchronize the narrow bandwidth data communications protocol.

3. An apparatus as defined in claim 2, wherein said power line interfacing means further includes an input bandpass filter for filtering out-of-band interference signals from both said wide bandwidth and narrow bandwidth data communications protocols.

4. (Amended) An apparatus as defined in claim 3, wherein said power line interfacing means further includes an output filtering means positioned responsive to said protocol transmitting and receiving means for filtering an output data communications prior to initiating a selected data communications protocol onto the power line.

5. An apparatus as defined in claim 1, wherein said wide and narrow bandwidth protocol transmitting and receiving means includes input protocol filtering means responsive to said power line interfacing means for selectively filtering either the wide bandwidth protocol or the narrow bandwidth protocol, input protocol receiving means responsive to said input protocol filtering means for receiving a filtered data communications protocol, and output protocol transmitting means responsive to said protocol controlling means and connected to said power line interfacing means for transmitting a selected one of either the wide bandwidth protocol or the narrow bandwidth protocol to the power line.

6. An apparatus as defined in claim 5, wherein said input protocol filtering means comprises a bandpass filter for reducing noise components of both the wide bandwidth data communications protocol and the narrow bandwidth data communications protocol and a narrow bandwidth digital filter for filtering only the narrow bandwidth data communications protocol.

7. An apparatus as defined in claim 5, wherein said protocol transmitting and receiving means includes a transmitter for transmitting data communications and a waveform memory device responsive to said transmitter for storing a digital representation of a selected waveform to be used for either the wide bandwidth protocol or the narrow bandwidth protocol for transmission.

8. An apparatus as defined in claim 1, further comprising application interfacing means responsive to said protocol controlling means for interfacing with a predetermined user application.

9. An apparatus as defined in claim 8, wherein said protocol controlling means includes a protocol transmitting and receiving interface controller responsive to said protocol transmitting and receiving means for controlling transmitting and receiving of data communications protocols and an application controller responsive to said protocol transmitting and receiving interface controller and said application interfacing means for controlling data communications between said protocol transmitting and receiving interface controller and said application interfacing means.

10. An apparatus as defined in claim 1, wherein the wide bandwidth protocol comprises a spread spectrum CEBus data communications protocol, and wherein the narrow bandwidth protocol comprises an X10 data communications protocol.

11. A data communications controlling apparatus for controlling data communications across a power line, the apparatus comprising:

- a power line interface for interfacing with a power line so as to detect both a wide bandwidth data communications protocol being initiated across the power line and a narrow bandwidth data communications protocol being initiated cross the power line associated with a power line mains frequency and so as to initiate either the wide bandwidth data communications protocol onto the power line or the narrow bandwidth data communications protocol onto the power line associated with the power line mains frequency, a narrow bandwidth of the narrow bandwidth data communications protocol falling within a wide bandwidth of the wide bandwidth data communications protocol;
- an input wide and narrow bandwidth protocol receiver responsive to said power line interface for receiving either the wide bandwidth protocol or the narrow bandwidth protocol from the same data communications signal path;
- an output wide and narrow bandwidth protocol transmitter connected to said power line interface for transmitting a selected one of either the wide bandwidth protocol or the narrow bandwidth protocol to the power line through the same data communications signal path; and
- a protocol controller responsive to said input protocol receiver and said output protocol transmitter for controlling the receipt of and the transmission of said wide bandwidth and narrow bandwidth data communications protocols.

12. An apparatus as defined in claim 11, wherein said power line interface includes a line coupler for coupling to the power line and a zero crossing detector connected to said line coupler for detecting a moment substantially at which a mains voltage passes through zero so as to properly synchronize the narrow bandwith data communications protocol.

13. An apparatus as defined in claim 12, wherein said power line interface further includes an input bandpass filter for filtering out-of-band interference signals from both said wide bandwidth and narrow bandwidth data communications protocols.

14. An apparatus as defined in claim 13, wherein said power line interface further includes an output filter positioned responsive to said output wide and narrow bandwith protocol transmitter for filtering an output data communications prior to initiating a selected data communications protocol onto the power line.

15. An apparatus as defined in claim 14, further comprising an input protocol filter responsive to said power line interface for selectively filtering either the wide bandwidth protocol or the narrow bandwidth protocol.

16. An apparatus as defined in claim 15, wherein said input protocol filter comprises a bandpass filter for reducing noise components of both the wide bandwidth data communications protocol and the narrow bandwidth data communications protocol and a narrow bandwidth digital filter for filtering only the narrow bandwidth data communications protocol.

17. An apparatus as defined in claim 16, further comprising a waveform memory device responsive to said output protocol transmitter for storing a digital representation of a selected waveform to be used for either the wide bandwidth protocol or the narrow bandwidth protocol for transmission.

18. An apparatus as defined in claim 17, further comprising an application interface responsive to said protocol controller for interfacing with a predetermined user application.

19. An apparatus as defined in claim 18, wherein said protocol controller includes a protocol transmitting and receiving interface controller responsive to said output protocol transmitter and said input protocol receiver for controlling transmitting and receiving of data communications protocols and an application controller responsive to said protocol transmitting and receiving interface controller and said application interface for controlling data communications between said protocol transmitting and receiving interface controller and said application interface.

20. An apparatus as defined in claim 19, wherein the wide bandwidth protocol comprises a spread spectrum CEBus data communications protocol, and wherein the narrow bandwidth protocol comprises an X10 data communications protocol.

21. A data communications controlling apparatus for controlling data communications across a power line, the apparatus comprising:

- power line interfacing means for interfacing with a power line so as to detect both a wide banwidth data communications protocol being initiated across the power line and a narrow bandwidth data communications protocol being initiated across the power line synchronously with a power line mains frequency and so as to initiate either the wide bandwidth data communications protocol onto the power line or the narrow bandwidth data communications protocol onto the power line synchronously with the power line mains frequency, a narrow bandwidth of the narrow bandwidth data communications protocol falling within a wide bandwidth of the wide bandwidth data communications protocol;
- a single integrated circuit connected to said power line interfacing means for provide network protocol data communications, said integrated circuit including wide and narrow bandwidth protocol transmitting and receiving means responsive to said power line interfacing means for selectively transmitting either the wide bandwidth protocol or the narrow bandwidth protocol onto the power line and for receiving both the wide bandwidth protocol and the narrow bandwidth protocol, said wide and narrow bandwidth protocol transmitting and receiving means including input protocol filtering means responsive to said power line interfacing means for selectively filtering either the wide bandwidth protocol or the narrow bandwidth protocol, input protocol receiving means responsive to said input protocol filtering means for receiving a filtered data communications protocol, output protocol transmitting means for transmitting a selected one of either the wide bandwidth protocol or the narrow bandwidth protocol to the power line, and protocol controlling means responsive to said protocol transmitting and receiving means for controlling the receipt of and the transmission of said wide bandwidth and narrow bandwidth data communications protocols; and output filtering means positioned responsive to said protocol transmitting and receiving means of said single integrated circuit for filtering an output data communications prior to initiating a selected data communications protocol onto the power line.

22. An apparatus as defined in claim 21, wherein said protocol transmitting and receiving means includes a transmitter for transmitting data communications and a waveform memory device responsive to said transmitter for storing a digital representation of a selected waveform to be used for either the wide bandwidth protocol or the narrow bandwidth protocol for transmission.

23. An apparatus as defined in claim 22, wherein said power line interfacing means includes a line coupler for coupling to the power line and a zero crossing detector connected to said line coupler for detecting a moment substantially at which a mains voltage passes through zero so as to properly synchronize the narrow bandwidth data communications protocol.

24. An apparatus as defined in claim 23, wherein said power line interfacing means further includes an input bandpass filter for filtering out-of-band interference signals from both said wide bandwidth and narrow bandwidth data communications protocols.

25. An apparatus as defined in claim 24, wherein said input protocol filtering means comprises a bandpass filter for reducing noise components of both the wide bandwidth data communications protocol and the narrow bandwidth data communications protocol and a narrow bandwidth digital filter for filtering only the narrow bandwidth data communications protocol.

26. An apparatus as defined in claim 25, further comprising application interfacing means responsive to said protocol controlling means for interfacing with a predetermined user application.

27. An apparatus as defined in claim 26, wherein said protocol controlling means includes a protocol transmitting and receiving interface controller responsive to said protocol transmitting and receiving means for controlling transmitting and receiving of data communications protocols and an application controller responsive to said protocol transmitting and receiving interface controller and said application interfacing means for controlling data communications between said transmitting and receiving interface controller and said application interfacing means.

28. An apparatus as defined in claim 27, wherein the wide bandwidth protocol comprises a spread spectrum CEBus data communications protocol, and wherein the narrow bandwidth protocol comprises an X10 data communications protocol.

29. A data communications controlling apparatus for controlling data communications across a power line, the apparatus comprising:

power line interfacing means for interfacing with the power line so as to detect both a wide bandwidth data communications protocol being initiated across the power line and a narrow bandwidth data communications protocol being initiated across the power line synchronously with a power line mains frequency and so as to initiate the narrow bandwidth data communications protocol onto the power line synchronously with the power line mains frequency, a narrow bandwidth of the narrow bandwidth data communications protocol falling within a wide bandwidth of the wide bandwidth data communications protocol;

wide and narrow bandwidth protocol receiving means responsive to said power line interfacing means for receiving both the wide bandwidth protocol and the narrow bandwidth protocol, said wide and narrow bandwidth protocol receiving means including input protocol filtering means responsive to said power line interfacing means for selectively filtering either the wide bandwidth protocol or the narrow bandwidth protocol and input protocol receiving means responsive to said input protocol filtering means for receiving filtered data communications protocol;

narrow bandwidth protocol transmitting means for transmitting the narrow bandwidth data communications protocol onto the power line;

protocol controlling means responsive to said both wide and narrow bandwidth protocol receiving means and said transmitting means for controlling the receipt of said wide bandwidth and narrow bandwidth data communications protocols and the transmission of the narrow bandwidth data communications protocol.

30. An apparatus as defined in claim 29, wherein said protocol transmitting means includes a transmitter for transmitting data communications and a waveform memory device responsive to said transmitter for storing a digital representation of a selected waveform to be used for either the wide bandwidth protocol or the narrow bandwidth protocol for transmission.

31. An apparatus as defined in claim 30, wherein said power line interfacing means includes a line coupler for coupling to the power line and a zero crossing detector connected to said line coupler for detecting a moment substantially at which a mains voltage passes through zero so as to properly synchronize the narrow bandwidth data communications protocol.

32. An apparatus as defined in claim 31, wherein said power line interfacing means further includes an input bandpass filter for filtering out-of-band interference signals from both said wide bandwidth and narrow bandwidth data communications protocols.

33. An apparatus as defined in claim 32, wherein said input protocol filtering means comprises a bandpass filter for reducing noise components of both the wide bandwidth data communications protocol and the narrow bandwidth data communications protocol and a narrow bandwidth digital filter for filtering only the narrow bandwidth data communications protocol.

34. An apparatus as defined in claim 33, further comprising application interfacing means responsive to said protocol controlling means for interfacing with a predetermined user application.

35. An apparatus as defined in claim 34, wherein said protocol controlling means includes a protocol transmitting and receiving interface controller responsive to said protocol receiving means and said protocol transmitting means for controlling transmitting and receiving of data communications protocols and an application controller responsive to said protocol transmitting and receiving interface controller and said application interfacing means for controlling data communications between said protocol transmitting and receiving interface controller and said application interfacing means.

36. An apparatus as defined in claim 35, wherein the wide bandwidth protocol comprises a spread spectrum CEBus data communications protocol, and wherein the narrow bandwidth protocol comprises an X10 data communications protocol.

37. A data communications controlling apparatus for controlling data communications across a power line, the apparatus comprising:

power line interfacing means for interfacing with the power line so as to detect both a wide bandwidth data communications protocol being initiated across the power line and a narrow bandwidth data communications protocol being initiated across the power line synchronously with a power line mains frequency and so as to initiate the narrow bandwidth data communications protocol onto the power line synchronously with the power line mains frequency, a narrow bandwidth of the narrow bandwidth data communications protocol falling within a wide bandwidth of the wide bandwidth data communications protocol;

wide and narrow bandwidth protocol receiving means responsive to said power line interfacing means for receiving both the wide bandwidth protocol and the narrow bandwidth protocol, said wide and narrow bandwidth input protocol receiving means including input protocol filtering means responsive to said power line interfacing means for selectively filtering either the wide bandwidth protocol or the narrow bandwidth protocol and input protocol receiving means responsive to said input protocol filtering means for receiving a filtered data communications protocol;

wide bandwidth output protocol transmitting means for transmitting the wide bandwidth data communications protocol onto the power line; and protocol controlling means connected to both said wide and narrow bandwidth protocol receiving means and said output protocol transmitting means for controlling the receipt of said wide bandwidth and narrow bandwidth data communications protocols and the transmission of the wide bandwidth data communications protocol.

38. An apparatus as defined in claim 37, wherein said protocol transmitting means includes a transmitter for transmitting data communications and a waveform memory device responsive to said transmitter for storing a digital representation of a selected waveform to be used for either the wide bandwidth protocol or the narrow bandwidth protocol for transmission.

39. An apparatus as defined in claim 38, wherein said power line interfacing means includes a line coupler for coupling to the power line and a zero crossing detector connected to said line coupler for detecting a moment substantially at which a mains voltage passes through zero so as to properly synchronize the narrow bandwidth data communications protocol.

40. An apparatus as defined in claim 39, wherein said power line interfacing means further includes an input bandpass filter for filtering out-of-band interference signals from both said wide bandwidth and narrow bandwidth data communications protocols.

41. An apparatus as defined in claim 40, wherein said input protocol filtering means comprises a bandpass filter for reducing noise components of both the wide bandwidth data communications protocol and the narrow bandwidth data communications protocol and a narrow bandwidth digital filter for filtering only the narrow bandwidth data communications protocol.

42. An apparatus as defined in claim 41, further comprising application interfacing means responsive to said protocol controlling means for interfacing with a predetermined user application.

43. An apparatus as defined in claim 42, wherein said protocol controlling means includes a protocol transmitting and receiving interface controller responsive to said wide and narrow bandwidth protocol receiving means and said protocol transmitting means for controlling transmitting and receiving of data communications protocols and an application controller responsive to said protocol transmitting and receiving interface controller and said application interfacing means for controlling data communications between said protocol transmitting and receiving interface controller and said application interfacing means.

44. An apparatus as defined in claim 43, wherein the wide bandwidth protocol comprises a spread spectrum CEBus data communications protocol, and wherein the narrow bandwidth protocol comprises an X10 data communications protocol.

45. A method of controlling data communications across a power line, the method comprising:

interfacing with the power line so as to detect both a wide bandwidth data communications protocol being initiated across the power line and a narrow bandwidth data communications protocol being initiated across the power line so as to have relationship with a power line mains frequency and so as to initiate either the wide bandwidth data communications protocol onto the power line so as to have relationship with the power line mains frequency or the narrow bandwidth data communications protocol onto the power line, a narrow bandwidth of the narrow bandwidth data communications protocol falling within a wide bandwidth of the wide bandwidth data communications protocol;

receiving both the wide bandwidth data communications protocol and the narrow bandwidth data communications protocol;

selectively transmitting either the wide bandwidth data communications protocol or the narrow bandwidth data communications protocol onto the power line; and controlling the receipt of and the transmission of both said wide bandwidth and narrow bandwidth data communications protocols.

46. A method as defined in claim 45, wherein the step of interfacing with the power line includes coupling to the line, detecting a moment substantially at which a mains voltage of the power line passes through zero so as to properly synchronize the narrow bandwidth data communications protocol, and filtering out-of-band interference signals from both said wide bandwidth and narrow bandwidth data communications protocol.

47. A method as defined in claim 46, wherein the step of interfacing with the power line further includes filtering an output data communications prior to initiating a selected data communications protocol onto the power line.

48. A method as defined in claim 47, further comprising selectively filtering either the wide bandwidth protocol or the narrow bandwidth protocol.

49. A method as defined in claim 48, wherein the step of selectively filtering includes reducing noise components of both the wide bandwidth data communications protocol and the narrow bandwidth data communications protocol.

50. A method as defined in claim 49, further comprising storing a digital representation of a selected waveform to be used for transmission of either the wide bandwidth protocol or the narrow bandwidth protocol.

51. A method as defined in claim 50, further comprising interfacing with a predetermined user application and controlling data communications to and from the predetermined user application.

52. A method as defined in claim 51, wherein the wide bandwidth protocol comprises a spread spectrum CEBus data communications protocol, and wherein the narrow bandwidth protocol comprises an X10 data communications protocol.

53. A method of controlling data communications across a power line, the method comprising:

interfacing with a power line so as to detect both a spread spectrum CEBus data communications protocol being initiated across the power line and an X10 data communications protocol being initiated across the power line synchronously with a power line mains frequency and so as to initiate either the spread spectrum CEBus data communications protocol onto the power line or the X10 data communications protocol onto the power line synchronously with the power line mains frequency, the bandwidth of the X10 data communications protocol falling within the bandwidth of the CEBus data communications protocol;

receiving both the spread spectrum CEBus data communications protocol and the X10 data communications protocol from the same data communications signal path;

selectively transmitting either the spread spectrum CEBus data communications protocol or the X10 data communications protocol onto the power line through the same data communications signal path; and controlling the receipt of and the transmission of the spread spectrum CEBus and the X10 data communications protocols.

54. A method as defined in claim 53, wherein the step of interfacing with the power line includes coupling to the power line, detecting a moment substantially at which a mains voltage of the power line passes through zero so as to properly synchronize the X10 data communications protocol, and filtering out-of-band interference signals from both the spread spectrum CEBus and the X10 data communications protocols, and wherein the step of receiving includes selectively filtering either the spread spectrum CEBus data communications protocol or the X10 data communications protocol.

55. A method as defined in claim 54, wherein the step of interfacing with the power line further includes selectively filtering an output data communications prior to initiating a selected data communications protocol onto the power line.

56. A method as defined in claim 55, wherein the step of selectively filtering includes reducing noise components of both the spread spectrum CEBus data communications protocol and the X10 data communications protocol.

57. A method as defined in claim 53, further comprising storing a digital representation of a selected waveform to be used for transmission of either the spread spectrum CEBus data communications protocol or the X10 data communications protocol.

58. A method as defined in claim 57, further comprising interfacing with a predetermined user application and controlling data communications to and from the predetermined user application.

* * * * *